UNITED STATES PATENT OFFICE.

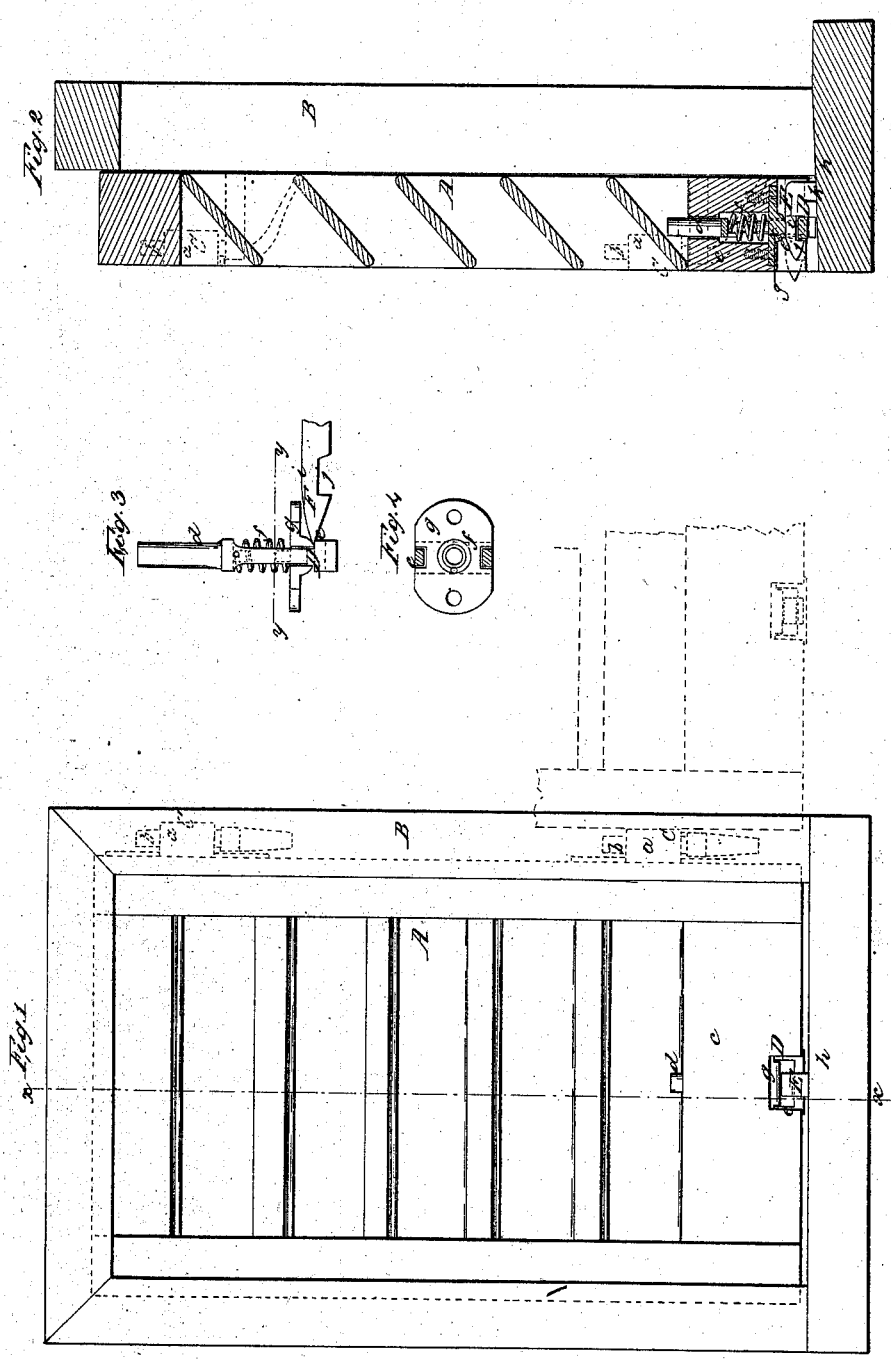

THOMAS C. BALL, OF SPRINGFIELD, VERMONT, ASSIGNOR TO HIMSELF, D. M. SMITH, H. H. MASON, AND A. C. MASON, OF SAME PLACE.

IMPROVEMENT IN BLIND AND SHUTTER SUPPORTERS.

Specification forming part of Letters Patent No. 35,347, dated May 20, 1862.

*To all whom it may concern:*

Be it known that I, THOMAS C. BALL, of Springfield, in the county of Windsor and State of Vermont, have invented a new and Improved Shutter and Blind Supporter and Fastening; and I do hereby declare that the following is a full, clear, and exact description of the same, reference being had to the accompanying drawings, making a part of this specification, in which—

Figure 1 is a front or face view of a window-blind with my invention applied to it; Fig. 2, a vertical section of the same, taken in the line $x\ x$, Fig. 1; Fig. 3, a detached view of the supporter and fastening; Fig. 4, a horizontal section of the same, taken on the line $y\ y$, Fig. 3.

Similar letters of reference indicate corresponding parts in the several figures.

To enable those skilled in the art to fully understand and construct my invention, I will proceed to describe it.

A represents a window-blind, which may be constructed in the usual way. This blind is attached to the window-frame B by hinges C C, which are formed of eyes $a\ a$, attached to the blind, and pintles $b\ b$, which are secured to the window-frame, the eyes being allowed to rise and fall on the pintles $b\ b$, as well as turn freely thereon.

In the lower cross-piece, $c$, of the blind A there is fitted vertically a catch, D, formed of a pin, $d$, having a square loop or eye, $e$, at its lower end. Within this loop or eye $e$ there is placed a spiral spring, $f$, the upper end of which bears against the upper edge of the loop or eye $e$, the lower end bearing against a metal plate, $g$, which is secured to the bottom of the cross-piece $c$. This spring $f$ has a tendency to keep the pin $d$ and its loop or eye $e$ in an elevated state, as will be fully understood by referring to Figs. 2 and 3, the pin $d$, it will be understood, being allowed to rise and fall freely in the cross-piece $c$.

E represents a hook, which is secured to the sill $h$ of the window-frame B at its center. This hook has its upper surface beveled or inclined, as shown at $i$, the hook $j$ being formed by a recess in its under surface, as shown clearly in Fig. 2. The hook E has a horizontal position, and may be secured to the sill $h$ by having a vertical spike, $k$, at its inner end, which spike is driven into the sill, the spike and hook being in one piece. (See Fig. 2.)

F is a hook, which is driven into the building and is formed precisely like the hook E, with the exception that its spike end is in line with the hook end, the spike portion being driven horizontally into the building.

From the above description it will be seen that when the blind is closed the loop or eye $e$ of the pin $d$ is forced over or on the hook E, and in consequence of the inclined upper surface, $i$, of said hook the blind will be raised or elevated a little so as to take the weight of the blind off from the pintles $b\ b$ of the hinges when the loop or eye enters the recess $g'$. The same result, it will be also seen, is attained when the blind is opened. By this arrangement, therefore, the blind is prevented from sagging, as it is supported at the center of its lower end.

Having thus described my invention, what I claim as new, and desire to secure by Letters Patent, is—

The combination of the catch D with the blind and the lifting-hooks E F, in the manner and for the purpose herein shown and described.

THOS. C. BALL.

Witnesses:
SAM FINLAY, 2d,
SAML. W. PORTER.